(12) United States Patent
Matsubara et al.

(10) Patent No.: US 7,604,269 B2
(45) Date of Patent: Oct. 20, 2009

(54) IMPACT ABSORBING DEVICE

(75) Inventors: Kousuke Matsubara, Yokohama (JP);
Kenji Murakami, Yokohama (JP)

(73) Assignee: NHK Spring Co. Ltd., Yokohama (JP)

( * ) Notice: Subject to any disclaimer, the term of this patent is extended or adjusted under 35 U.S.C. 154(b) by 12 days.

(21) Appl. No.: 12/133,994

(22) Filed: Jun. 5, 2008

(65) Prior Publication Data
US 2008/0309101 A1 Dec. 18, 2008

(30) Foreign Application Priority Data
Jun. 5, 2007 (JP) ............................ P2007-149006

(51) Int. Cl.
*B60R 19/38* (2006.01)
(52) U.S. Cl. .................. 293/119; 293/132; 296/187.03; 188/371
(58) Field of Classification Search ............ 296/187.03, 296/187.09, 146.6, 203.02, 203.03; 293/119, 293/132; 188/371
See application file for complete search history.

(56) References Cited

U.S. PATENT DOCUMENTS 5,074,391 A * 12/1991 Rosenzweig ................ 188/374
5,351,791 A * 10/1994 Rosenzweig ................ 188/372
6,302,458 B1 10/2001 Wang et al. ................. 293/132

FOREIGN PATENT DOCUMENTS

| JP | 6-64489 | 3/1994 |
| JP | 11-291845 | 10/1999 |
| JP | 2002-200949 | 7/2002 |

* cited by examiner

Primary Examiner—Lori L. Lyjak
(74) Attorney, Agent, or Firm—Winston & Strawn LLP

(57) ABSTRACT

An impact absorbing device includes an attachment component having one-or-more holes, an impact absorption pipe which absorbs external impacts and arranged so that it can slide axially and coaxially within the attachment component, one-or-more movable resistance bodies arranged so that they can move freely within the one-or-more holes, an impact absorption pipe movement component support component, an impact absorption pipe movement component, a support part having a first section and a second section formed in this order so that a distance between each of the sections and an interior side wall of the attachment component becomes smaller respectively, a support part movement component which provides an energization power to the support part, wherein the first section is in a position which faces the one-or-more holes of the attachment component when the support part comes into contact with a bottom part of the attachment component.

22 Claims, 8 Drawing Sheets

(A)

(B)

(A)

(B)

IMPACT ABSORBING DEVICE

CROSS REFERENCE TO RELATED APPLICATION

This application is based upon and claims the benefit of priority from the prior Japanese Patent Application No. 2007-149006, filed on Jun. 5, 2007; the entire contents of which are incorporated herein by reference.

BACKGROUND OF THE INVENTION

1. Field of the Invention

This invention is related to an impact absorbing device.

2. Description of the Related Art

Conventionally, a vehicle has been equipped with a bumper for preventing damage to the body of the vehicle from a collision with another object. In order to increase absorption abilities, a bumper reinforcement has been installed within the bumper and particularly to increase absorption abilities during a collision with another vehicle. In addition, as shown in Japanese Laid Open Patent H06-64489, Japanese Laid Open Patent H11-291845, and Japanese Laid Open Patent 2002-200949, a variety of devices have been proposed which increase absorption abilities.

However, the impact absorption abilities of the impact absorbing devices stated above can not be adjusted. In addition, the installation area is large which affects the overall length of a vehicle. Thus, an impact absorbing device has been demanded in which the impact absorption abilities can be changed between the time of a collision with another vehicle and the time of a collision with a pedestrian and which can avoid damage to the vehicle body. In addition, any impact absorbing device which does not affect the overall length of a vehicle and does not affect the installation area of a bumper etc during a normal state is preferred.

SUMMARY OF THE INVENTION

According to one embodiment of the present invention, an impact absorbing device is proposed including an attachment component, the attachment component having an attachment component upper part, an attachment component bottom part and an attachment component interior side wall part, the attachment component upper part and the attachment component bottom part having an opening respectively, the attachment component interior side wall part having one or more holes, the attachment component side wall part connecting both openings, an impact absorption pipe arranged so that the impact absorption pipe can slide axially and coaxially within the attachment component, with the impact absorption pipe having an impact absorption pipe upper part, an impact absorption pipe bottom part and an impact absorption pipe side wall part, the impact absorption pipe bottom part having a which projects towards the exterior, the impact absorption pipe side wall part absorbing external impacts and having a concave recessed part arranged on the exterior of the impact absorption pipe side wall part, and at least the upper side of the concave recessed part slanting from the upper side to the lower side of the impact absorption pipe, one or more movable resistance bodies arranged so that the one or more movable resistance bodies can move freely within the one or more holes, the one or more movable resistance bodies being formed of a harder material than that of the impact absorption pipe side wall part, an impact absorption pipe movement component support component arranged on the interior side of the impact absorption pipe, an impact absorption pipe movement component arranged between the impact absorption pipe upper part and the impact absorption pipe movement component support component, the impact absorption pipe movement component providing an energization power to the impact absorption pipe, a support part movably arranged within the attachment component, the support part having a support part upper part and a support part side wall part, the support part upper part having a flange which projects towards the exterior, the support part side wall part having a first section and a second section formed in this order so that a distance between each of the sections and an interior side wall of the attachment component becomes smaller respectively, the first section being in a position which is above the second section, the first section being in a position which faces the one or more holes of the attachment component when the support part comes into contact with the attachment component bottom part, and a support part movement component which provides an energization power to the support part, the support part movement component being arranged between the support part upper part flange and the attachment component bottom part.

According to one embodiment of the present invention, an impact absorbing device is proposed comprising an impact absorption pipe arranged so that the impact absorption pipe can slide axially and coaxially within an installation opening, the impact absorption pipe having an impact absorption pipe upper part, an impact absorption side wall part and impact absorption pipe bottom part, the impact absorption pipe bottom part having an opening on the interior side of the impact absorption pipe bottom part, the impact absorption pipe bottom part also having at least one of a flange which projects in an exterior direction and a flange which projects in an interior direction, an impact absorption pipe side wall part which absorbs external impacts, the side impact absorption pipe side wall part having a concave recessed part arranged on the interior of the impact absorption pipe side wall part, and at least the upper side of the concave recessed part formed so that the concave recessed part slants from the upper side to the lower side of the impact absorption pipe, a resistance component arranged so that the resistance component can slide axially and coaxially within the impact absorption pipe, the resistance component having a resistance component upper part, a resistance component the wall part and a resistance component bottom part, the resistance component side wall part having one or more holes, one or more movable resistance bodies arranged so that the one or more movable resistance bodies can move freely within the one or more holes of the resistance pipe side wall part, the one or more movable resistance bodies being formed of a harder material than that of the resistance pipe side wall part, an impact absorption pipe movement component which provides an energization power to the impact absorption pipe, the impact absorption pipe movement component being arranged between the impact absorption pipe upper part and the resistance component upper part, a support part movably arranged within the resistance component, the support part having a support part upper part and a support part side wall part, the support part upper part having a flange which projects towards the interior, the support part side wall part having a first section and a second section formed in this order so that a distance between each of the sections and an interior side wall of the resistance component becomes smaller respectively, the first section being in a position which is above the second section, the first section being in a position which faces the one or more holes of the resistance component when the support part comes into contact with the resistance component bottom part, and a support part movement component which provides an energization power to the support part, the support part movement component being arranged between the support part upper part flange and the resistance component bottom part.

DETAILED DESCRIPTION OF THE INVENTION

The present invention aims to provide an impact absorbing device having a structure which is capable of easily and completely absorbing an impact and can adjust impact absorption abilities according to a collision object.

The impact absorbing device related to embodiments of the present invention will be explained in detail below while referring to the diagrams. Furthermore, the present invention is not limited to the following embodiments. In addition, the structures which are the same in each embodiment have the same symbols and their explanation may be omitted.

Embodiment One

The impact absorbing device related to embodiment one of the present invention will be explained based on FIG. 1 to FIG. 4 and FIG. 8. In FIG. 1 to FIG. 4 and FIG. 8, the same parts have been given the same symbols.

Figure 1:
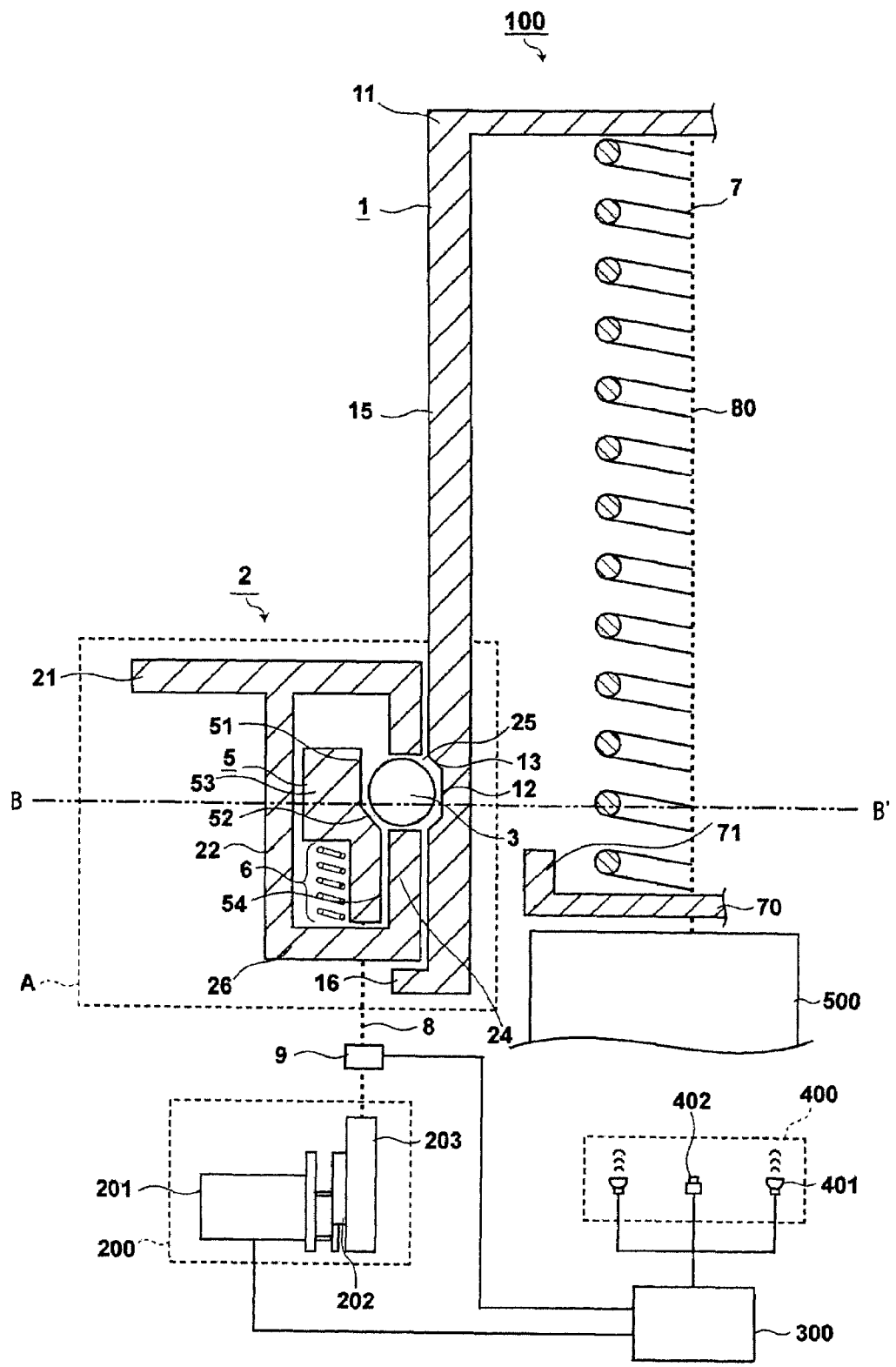
FIG. 1 is an outline structural diagram of an impact absorbing device related to embodiment one of the present invention.
Figure 2:
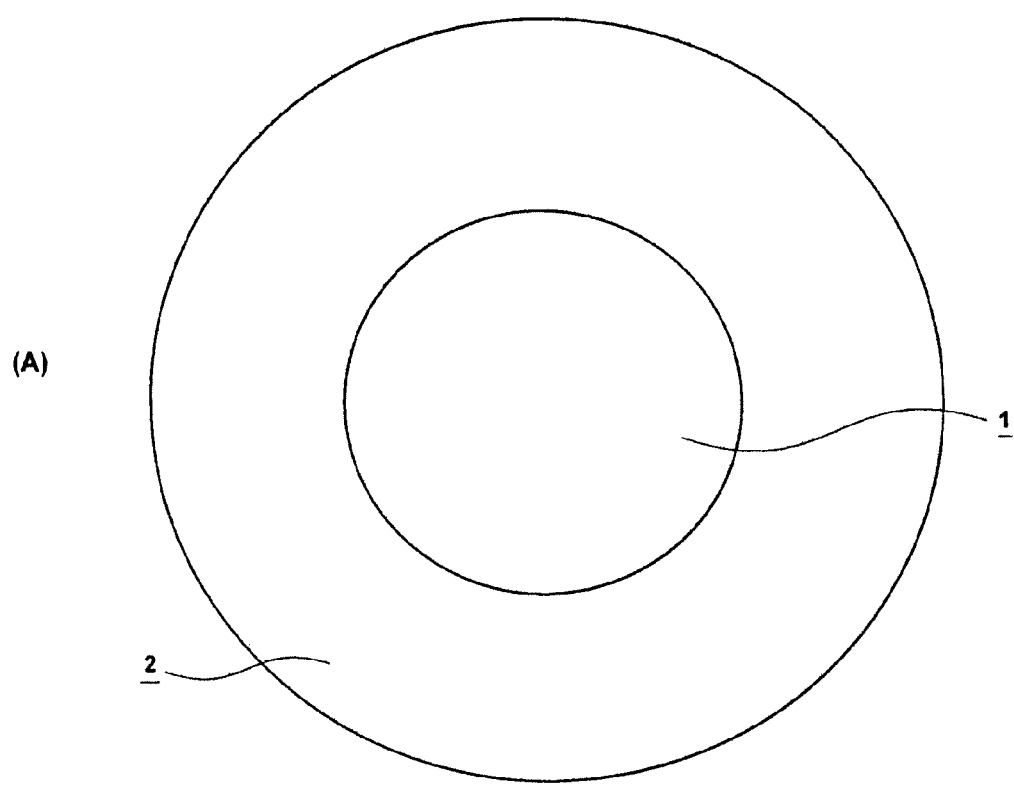
FIG. 2 is a cutaway diagram of one part of the impact absorbing device related to embodiment one of the present invention.
Figure 2:
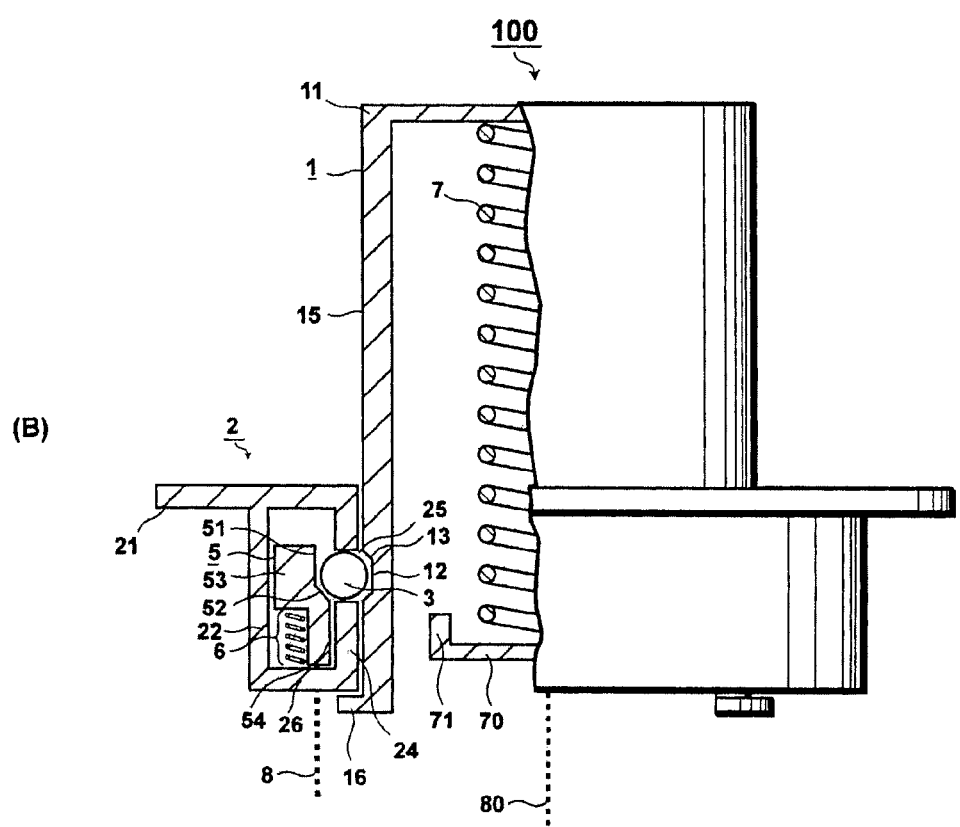

FIG. 1 is an outline structural view of an impact absorbing device related to embodiment one of the present invention. In addition, FIG. 2 is a cutaway diagram of one part of an impact absorbing device related to embodiment one of the present invention. FIG. 2(a) is a planar view diagram and 2(b) is a side view diagram and a cutaway cross sectional view of the side view diagram. As is shown in FIG. 1, the impact absorbing device includes an impact absorbing device body 100 and a motor unit 200. Also, the motor unit 200 is electrically connected to a controller 300. The controller 300 is also connected to a sensor device 400 which includes a radar 401 and a CCD camera 402.

The impact absorbing device body 100 related to embodiment one of the present invention includes an impact absorption pipe 1, an attachment component body 2, a movable resistance body 3, a support part 5, a support part movement component 6 (a support part sliding means for sliding the support part), an impact absorption pipe movement component 7 (an impact absorption pipe sliding means for sliding the impact absorption pipe) and an impact absorption pipe movement component support component 70 as is shown in FIG. 1. The whole structure of each part is as shown in FIG. 2(B). One end of a support part wire 8 is connected to the lower part of the support part 5 and the other end of the support part wire 8 is connected to the motor unit 200 via a lock mechanism 9 as shown in FIG. 1. In addition, one end of an impact absorption pipe wire 80 is connected to the interior center of an impact absorption pipe upper part 11 and the other end of the impact absorption pipe wire 80 is connected to another motor unit 210 (not shown in the diagram) via an impact absorption pipe wire lock mechanism 90 (not shown in the diagram).

An upper part 11 of the impact absorption pipe 1 has an open shape and a bottom part 16 has a closed cylinder shape. The bottom part of the impact absorption pipe 1 includes an impact absorption pipe bottom part flange 16 which projects towards the exterior. A side wall part of the impact absorption pipe 1 is formed with a thick, low hardness material so that an impact force of a collision with an object is absorbed and therefore is called below impact absorption pipe impact absorption side wall part 15 (below sometimes referred to as impact absorption side wall part). A roughly concave recess is formed at a predetermined position on the impact absorption side wall part 15. This part is called impact absorption pipe recess part 12. This predetermined position is a position which faces an opening of a movable resistance accommodation hole 25 which is arranged in an attachment component interior wall part 24 in the case where the impact absorption pipe 1 is projected from the attachment component body 2 explained below. An opening of the recess part 12 is formed in a taper shape so that at least the upper side of the recess part 12 slants from the upper side to the lower side of the impact absorption pipe 1. Below, this part is called an impact absorption pipe tapered part 13. However, it is not limited to this. The lower side of the recess part 12 may also be formed in a taper shape. In addition, a cross section shape of the recess part 12 may be formed in a roughly U shape which tapers in the direction of the opening. Furthermore, the tapered part 13 does not have to be flat, for example, the tapered part 13 may also have a semi-spherical shape. An impact absorption pipe movement component 7 and the impact absorption pipe movement component support component 70 which supports the impact absorption pipe movement component 7 are arranged within the impact absorption pipe 1. And, the impact absorption pipe 1 is arranged so that it can slide axially and coaxially within the installation opening of the attachment component body 2.

Figure 8:
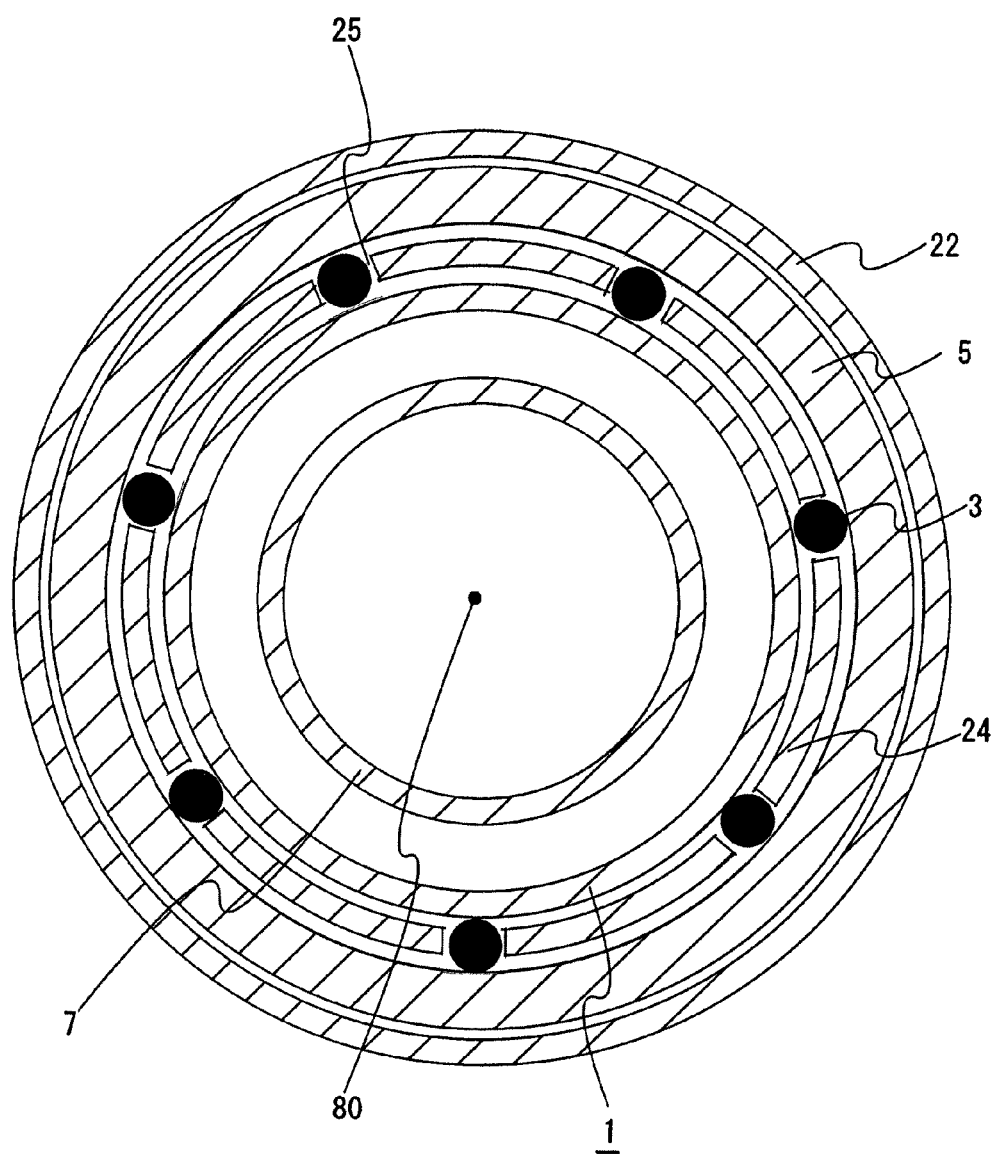
FIG. 8 is cross sectional view of the direction B-B' in FIG. 1 of an impact absorbing device related to embodiment one of the present invention.

The attachment component body 2 (below called a body) includes an upper part 21 with a large diameter and a bottom part 26 which has a smaller diameter than the upper part 21 and both the upper part 21 and the bottom part 26 have an opening which has the same diameter in a center part. Then, the openings of the upper part 21 and the bottom part 26 are connected by an attachment component interior wall part 24 (below called interior wall part) which includes at least one or more holes. In addition, the end part of the exterior periphery of the bottom part 26 and the upper part 21 are connected by an attachment component exterior wall part 22 (below called exterior wall part). However, the exterior wall part 22 does not necessarily have to be included. One or more movable resistance bodies 3 (below called resistance body respectively)

which generate a strong friction or stress with the above stated impact absorption side wall part 15 respectively during a collision with an object is arranged on each of one or more holes arranged on the interior wall part 24 respectively. Therefore, each of these one or more holes is called a movable resistance body accommodation hole 25 (below called resistance body hole respectively). Each of the movable resistance bodies 3 which are arranged in each of the resistance body holes 25 respectively are formed of a hard material and have an exterior diameter smaller than the interior diameter of each of the resistance body holes 25 respectively as shown in FIG. 8. In the present embodiment, each of the movable resistance bodies 3 is a steel sphere respectively. However, it is not limited to steel. Each of the resistance bodies can be formed from a harder material than the material of the impact absorption pipe 1 which absorbs impacts. The support part 5 is arranged so that it can slide coaxially and axially along the side wall of the interior wall part 24. However, the above stated impact absorption pipe 1 is arranged on the interior of the interior wall part 24 so that it can slide coaxially and axially. And, the body 2 is arranged in an impact absorbing device installation opening arranged in a bumper reinforcement. Therefore, by processing the impact absorbing device installation opening arranged in a bumper reinforcement, forming the installation body 2 and arranging the above stated support part 5 etc, it is possible to use the bumper reinforcement as the body 2.

The support part 5 includes a support part upper part flange 53 (below, called an upper part flange) which projects towards the exterior from the upper part of the support part 5. The side wall part of the support part 5 which faces the interior wall part 24 has two flat surfaces which are parallel to the flat surface of the interior wall part 24. That is, these two flat surfaces are a first section 51 and a second section 54 which are formed in this order so that the distance between each section and the interior wall part 24 becomes smaller. The first section 51 is set in a position which is above the second section 54. Therefore, in the support part 5, the distance between the first section 51 and the interior wall part 24 is far and the distance between the second section 54 and the interior wall part 24 is near in the case where the support part 5 is arranged on the exterior of the interior wall part 24. In addition, the boundary surface which connects the first section 51 and the second section 54 faces is formed so that it tapers from a lower direction to an upper direction, that is, from the second section 54 to the first section 51. Thus, this part is called the support part first tapered part 52 (below called first tapered part).

When the support part 5 is arranged on the exterior of the interior wall part 24 of the body 2, the distance between the first section 51 and the opening (below called interior opening) which faces the impact absorption pipe 1 of each of the movable resistance body accommodation holes 25 are respectively set larger than the diameter of each of the resistance bodies 3 which are arranged within each of the movable resistance body accommodation holes 25 respectively. However, the distance between the second section 54 and the interior openings of each of the same movable resistance body accommodation holes 25 are respectively set smaller than the diameter of each of the resistance bodies 3 respectively. Therefore, in the case where the first section 51 is positioned so that it faces the opening (below called exterior opening) of the support part 5 side of each of the movable resistance body accommodation holes 25, one end of each of the resistance bodies 3 come into contact with the first section 51 respectively and while in this state the other end of each of the resistance bodies 3 does not project from the interior opening of each of the movable resistance body accommodation holes 25 respectively. However, when the second section 54 is positioned so that it faces the exterior openings of each of the movable resistance body accommodation holes 25, one end of each of the resistance bodies 3 comes into contact with the second section 54 respectively and the other end of each of the resistance bodies 3 is significantly projected from the interior openings of each of the movable resistance body accommodation holes 25 respectively.

A support part movement component 6 is arranged between the upper part flange 53 and an attachment component bottom part 26 (below called bottom part). In this present embodiment, a coil spring is used for the support part movement component 6. However it is not limited to this. In addition, one end of a support part wire 8 is serially connected with the lower part of the support part 5. Therefore, when the support part wire 8 is retracted, the support part 5 moves in a direction of the lower part of the body 2 along the interior wall part 24 and comes into contact with the bottom part 26 while the support part movement component 6 is compressed. However, the support part 5 which is latched in a state where the support part movement component 6 is compressed by the retraction of the support part wire 8, is provided with an energization power by the support part movement component 6 in the case where the support part wire 8 is released and the support part 5 moves in a direction of the upper part of the body 2, comes into contact with an attachment component upper part 21 (below called upper part) and its movement is stopped. In the case where the support part 5 comes into contact with the bottom part 26, the first section 51 is in a position which faces the exterior openings of each of the movable resistance body accommodation holes 25. Therefore, each of the resistance bodies 3 which are arranged on each of the movable resistance body accommodation holes 25 respectively are able to move as far as coming into contact with the first section 51 in the case where each of the resistance bodies 3 move to the support part 5 respectively. However, in the case where the support part 5 is in contact with the upper part 21, the second section 54 is in a position which faces the exterior openings of each of the movable resistance body accommodation holes 25. Therefore, even if each of the resistance bodies 3 move within each of the movable resistance body accommodation holes 25 respectively in the direction of the support part 5, each of the resistance bodies 3 soon come into contact with the second section 54 respectively. Therefore, each of the resistance bodies 3 can hardly move in the direction of the support part 5 respectively.

Figure 6:
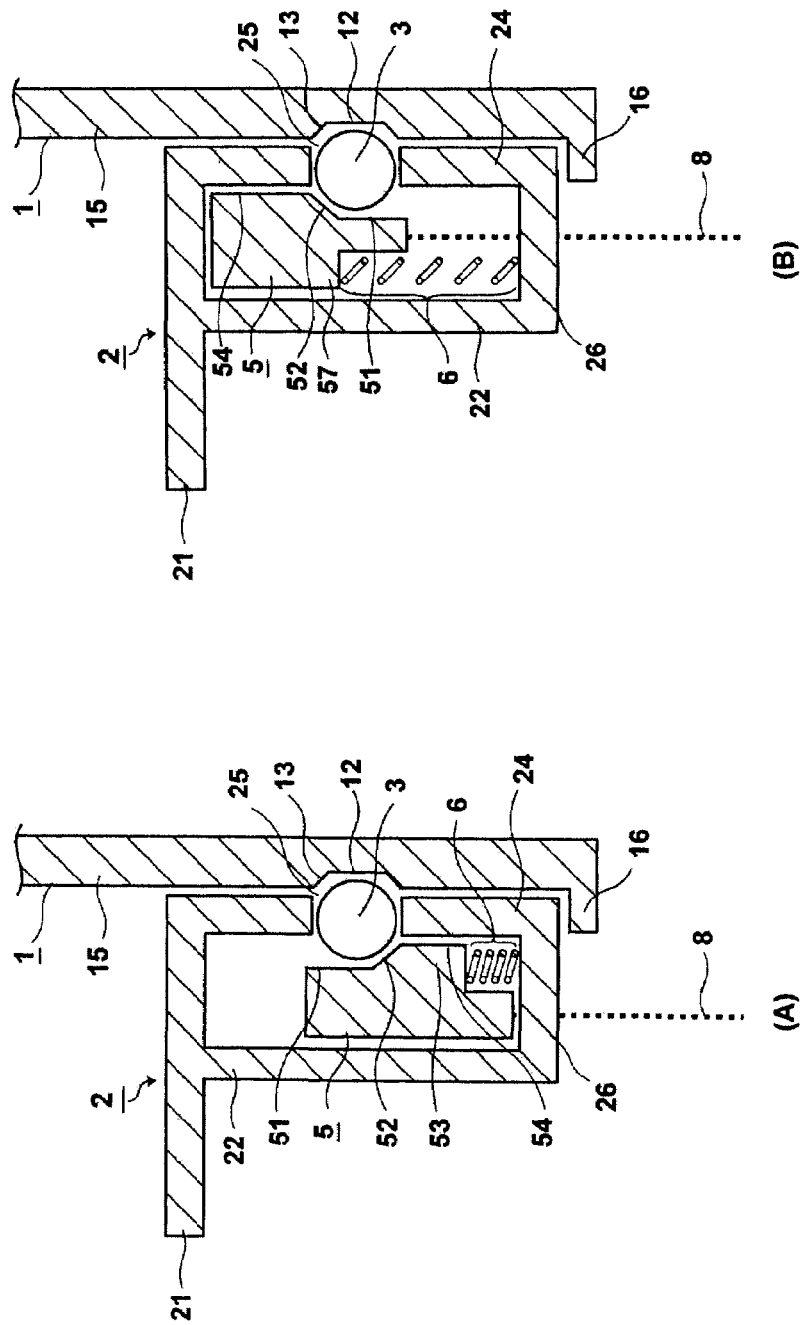
FIG. 6 is a structural diagram applied to part A shown in FIG. 1 of another example of a support part of an impact absorbing device related to embodiment one and example one of the present invention.

Furthermore, the shape of the support part 5 is not limited to the above explained shape. The support part 5 may also have a shape as shown in FIG. 6(A). FIG. 6 is a diagram which shows another shape of the support part 5 of the impact absorbing device related to embodiment one of the present invention and is an enlarged view of the part shown by A in FIG. 1. In the support part 5 shown in FIG. 6(A), the upper part flange 53 is formed on the interior side wall part of the support 5. That is, the lower side of the above stated second section 54 is used as the upper part flange 53. The arrangement of the support part movement component 6 between this flange 53 and the bottom part 26 is also the same. Because it is possible to reduce the width of the support part 5 in a horizontal direction by this structure, it is possible to reduce the installation area of the device.

The impact absorption pipe movement component 7 and the impact absorption pipe component support component 70 are arranged within the impact absorption pipe 1. The impact absorption pipe movement component 7 is a component which provides an energization power to the impact absorption pipe 1 for projecting the impact absorption pipe 1 from the body 2, and in the present embodiment a coil spring is used, however it is not limited to this. Any component which provides an energization power to the impact absorption pipe 1 may be used. One end of the impact absorption pipe movement component 7 is in contact with the interior of the upper part 11 of the impact absorption pipe 1 and the other end is arranged so that it contacts the upper surface of the impact absorption pipe movement component support part 70 which is arranged coaxially within the impact absorption pipe 1.

The impact absorption pipe movement component support component 70 is a component with a smaller exterior diameter than the interior diameter of the impact absorption pipe 1 and is arranged so that it can slide in axially in a perpendicular direction inside the impact absorption pipe 1. In the case where the impact absorbing device related to embodiment one of the present invention is arranged on a vehicle, it is arranged so that the back side of the impact absorption pipe movement component support component 70 can be pushed by a projection-shaped vehicle side pushed component 500 which is arranged on the vehicle. Therefore, when the present impact absorbing device is arranged on a vehicle, when the impact absorption pipe wire 80 is retracted, one end of which is connected to the interior center of the impact absorption pipe upper part 11, because the lower part of the impact absorption pipe movement component 7 is supported by the impact absorption pipe movement component support component 70 in which the lower side is pushed by the above stated vehicle side pushed component 500, the impact absorption pipe 1 becomes housed within the installation opening of the body 2 while the impact absorption pipe movement component is compressed. By latching the impact absorption pipe wire 80 with the impact absorption pipe wire lock mechanism 90, it is possible to house the impact absorbing device related to embodiment one of the present invention within the bumper reinforcement of a vehicle. Furthermore, a side wall part 71 is formed perpendicular in an upper direction on the exterior edge of the impact absorption pipe movement component support component 70. Therefore, in the state where the impact absorbing device related to embodiment one of the present invention is attached to a vehicle, the impact absorption pipe movement component 7 is arranged between the impact absorption pipe 1 and the impact absorption pipe movement component support component 70, and the movement of the impact absorption pipe movement component 7 in a horizontal direction is restricted by the side wall part 71 and surely extends in a perpendicular direction.

When the impact absorption pipe wire 80 is released, the impact absorption pipe 1 is provided with an energization power by the impact absorption pipe movement component 7 and projects in an upper direction from the installation opening of the body 2. As stated above, the impact absorption pipe 1 includes a bottom part flange 16 which projects in an exterior direction and the exterior diameter of the bottom part flange 16 is set larger than the interior diameter of the installation opening of the body 2. Therefore, the upper surface of the bottom part flange 16 comes into contact with the lower surface of the bottom part 26 which stops the entire impact absorption pipe 1 from popping out of the installation opening of the body 2. As a result, in the impact absorbing device related to embodiment one of the present invention the impact absorption pipe 1 is projected in the case where a collision with an object is predicted and it is possible to prepare the impact absorbing device to completely absorb an impact. Furthermore, the other end of the above stated impact absorption pipe wire 80 is connected to the motor unit 210 (not shown in the diagram) via the impact absorption pipe wire lock mechanism 90 (not shown in the diagram) and is retracted by the motor unit 210.

As stated above, the support part wire 8 is connected to the motor unit 8 via the support part wire lock mechanism 9. In the present embodiment the support part wire 8 is connected to the motor 201 of the motor unit 200 via a gearbox 202 and a pulley 203, however it is not limited to this. The pulley 203 etc may be arranged according to necessity. In addition, although not shown in the diagram the motor unit 210 has the same structure.

The support part wire lock mechanism 9 latches the support part wire 8 which is retracted by the motor unit 200 based on an instruction from the controller 300 (below, this state is sometimes called a locked state). In this locked state, the support part 5 compresses the support part movement component 6 and remains in contact with bottom part 26. Therefore, if the lock is released the support part 5 moves in a direction of the upper part of the body 2 by the rebound force of the compressed support part movement component 6. In the present embodiment, an example where the support part wire lock mechanism 9 was arranged on the exterior of the impact absorbing device body 100 was shown. However it is not limited to this. For example, the support part wire lock mechanism 9 may be arranged in the bottom part 26. Furthermore, the release of the support part wire 8 by this support part wire lock mechanism 9 may be controlled by the controller 300 which receives data from the sensor device 400 which has detected an impact and the operation of the motor unit 200 and the operation of the support part wire lock mechanism 9 may be operated together and controlled. In addition, although not shown in the diagram, the impact absorption pipe wire lock mechanism 9 is the same.

The controller 300 is formed from a plurality of semiconductor integrated circuits (IC), receives data from the sensor device 400 and transmits an operation signal to the motor unit 200 and 210. In addition, the controller 300 controls the operations of the support part wire lock mechanism 9 and the impact absorption pipe wire lock mechanism 90.

In the present embodiment, a sensor device having a radar 401 and a CCD camera 402 is used as the sensor device 400. The distance to an object is detected by the radar 401 and the shape of this object is detected by the CCD camera 402. The distance to and the shape of an object is transmitted to the controller 300 as data and the controller 300 judges whether this object is a pedestrian or not from the shape of the object and transmits a necessary instruction to the motor unit 200. Furthermore, the structure of the sensor device 400 is not limited to the structure stated above.

In the present embodiment, among carbon steel pipes for machine structure (STKM), SKTM 13C is used for the exterior pipe 1. According to the present embodiment, carbon steel pipes for machine structure (STKM) which have undergone a heat treatment are used for the support part 5. Specifically, among carbon tool steels (SK), STKM 13C which have undergone a heat treatment or SK7 are used for the support part 5. In addition, according to the present embodiment high carbon chromium bearing steel material (SUJ-2) or high hardness stainless steel (SUS440C) is used in the movable resistance bodies 3.

Figure 3:
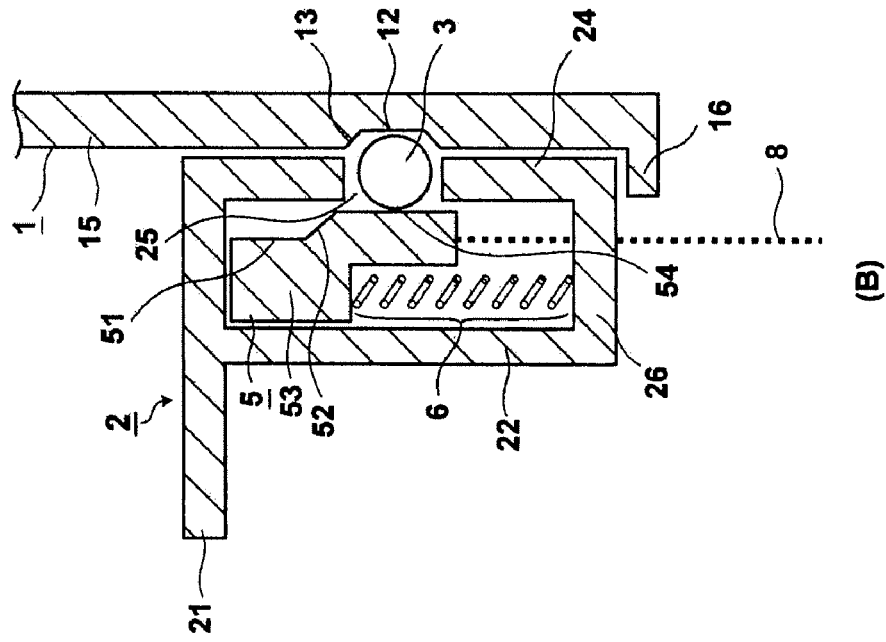
FIG. 3 is an enlarged diagram of one part of the impact absorbing device related to embodiment one of the present invention during a normal state and during a lock release of a support part wire.
Figure 3:
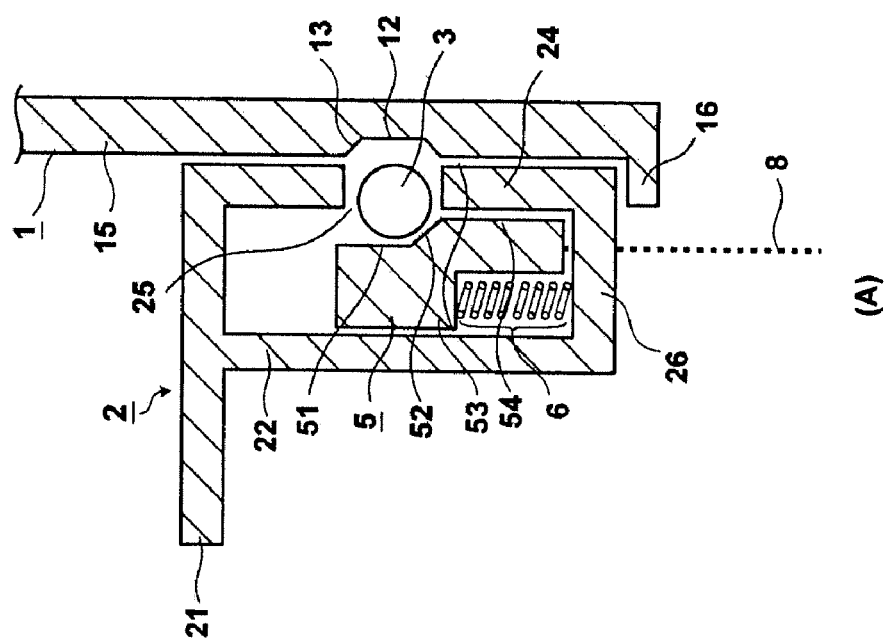
Figure 4:
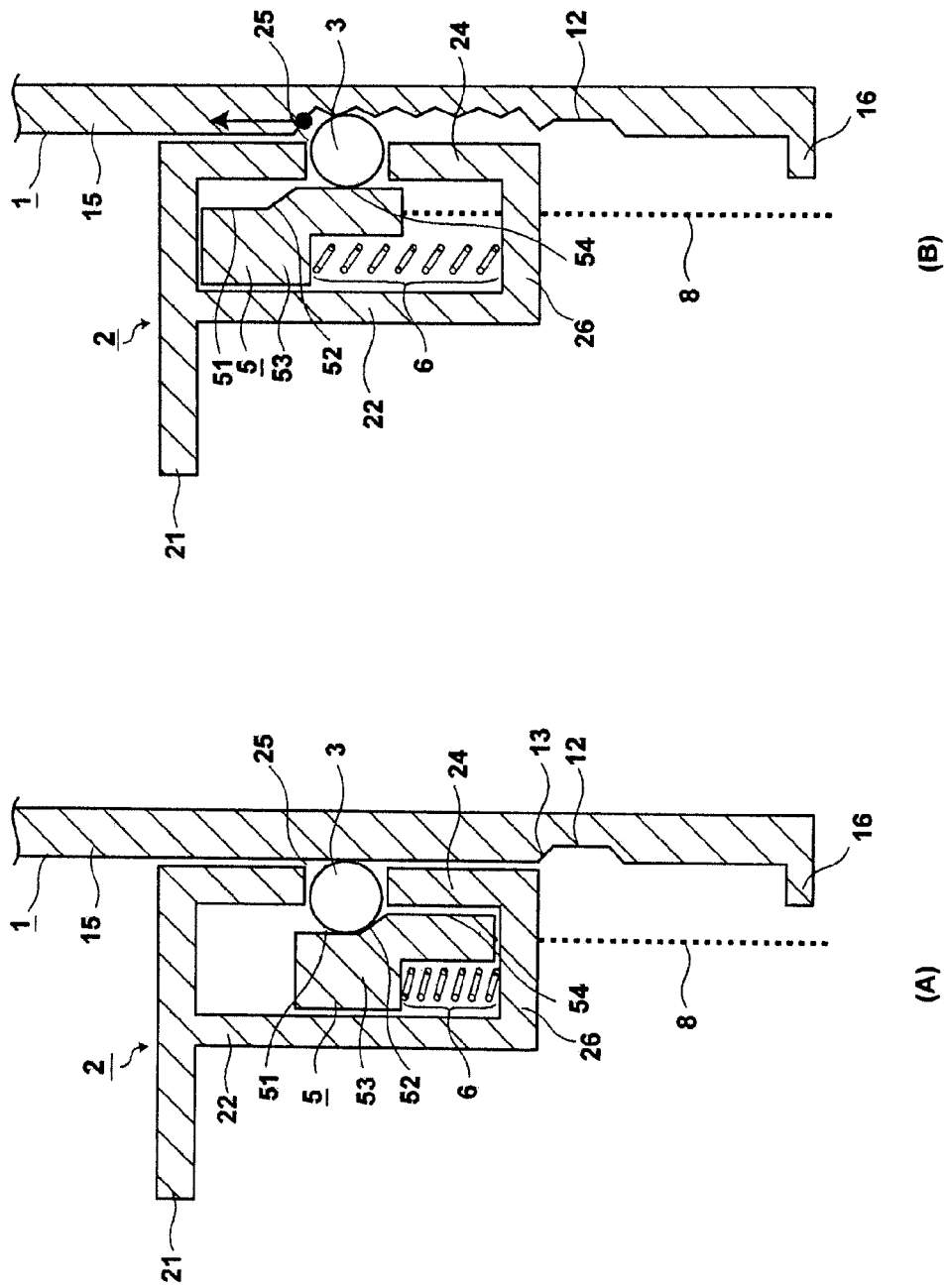
FIG. 4 is an enlarged diagram of one part of the impact absorbing device related to embodiment one of the present invention in the case where a weak impact and a strong impact are applied to the device.

Next, the workings of the support part 5 of the impact absorbing device related to the present embodiment will be explained based on FIG. 3 and FIG. 4. FIG. 3 is an enlarged view of one part of an impact absorbing device related to one embodiment of the present invention. FIG. 3(A) shows the support part wire 8 in a locked state and FIG. 3(B) shows the support part wire 8 at the time of release. FIG. 4 is an enlarged diagram of one part of the impact absorbing device related to embodiment one of the present invention in the case where an impact is applied to the device. FIG. 4(A) shows the state when a weak impact is applied and FIG. 4(B) shows the case when a strong impact is applied. The impact absorbing device related to embodiment one of the present invention is characterized by preparing the device to absorb an impact by projecting the impact absorption pipe 1 from the body 2 and being able to switch a means for absorbing an impact at the stage where an impact to parts which are attached to the exterior of the impact absorbing device such as a bumper for example, is predicted.

The impact absorbing device related to embodiment one of the present invention is attached to an attachment opening arranged on a bumper reinforcement on the interior of a bumper in a state in which the impact absorption pipe 1 is projected from the body 2. After attachment the support part wire 8 is retracted by the motor unit 200, the support part 5 is positioned in a position in which the first section 51 faces the exterior openings of each of the movable resistance body accommodation holes 25 and the support part wire 8 is latched by the support part wire lock mechanism 9. In addition, at the same time, the impact absorption pipe wire 80 is retracted by the motor unit 210, the impact absorption pipe 1 is housed within the opening of the body 2 and the impact absorption pipe wire 80 is latched by the impact absorption pipe wire lock mechanism 90. This state is called a normal state.

The sensor device 400 transmits data related to an object to the controller 300 and when the controller 300 judges that this object is a pedestrian and predicts a weak impact, instructs the impact absorption pipe wire lock mechanism 90 to release the impact absorption pipe wire 80 but does not instruct the support part wire lock mechanism 9 to release the support part wire 9. Therefore, the support part wire 8 remains latched by the support part wire lock mechanism 9. In this state, because the first section 51 of the support part 5 faces the exterior openings of each of the movable resistance body accommodation holes 25, each of the movable resistance bodies 3 become freely movable between the recess part 12 and the first section 51 via each of the movable resistance body accommodation holes 25 respectively (see FIG. 3(A)).

In the state described above, the impact absorption pipe 1 moves in an interior direction of the installation opening of the body 2 (in the lower direction towards FIG. 4(A)) as shown in FIG. 4(A) when an impact is applied to the impact absorption pipe 1. Together with the movement of the impact absorption pipe 1, each of the movable resistance bodies 3 are made to move in an exterior direction (that is in the direction of the support part 5) of each of the movable resistance body accommodation holes 25 by the tapered part 13 respectively. Furthermore, when the impact absorption pipe 1 moves, because the distance to the interior openings of each of the movable resistance body accommodation holes 25 from the first section is larger than the diameter of each of the movable resistance bodies 3 respectively as stated above, the impact absorption pipe 1 side of each of the movable resistance bodies 3 are not projected from the interior openings of each of the movable resistance body accommodation holes 25 respectively, the impact absorption pipe 1 contacts with each of the movable resistance bodies 3 without any resistance and is housed within the installation opening of the body 2. At this time, the impact absorption pipe movement component 7 is compressed and the impact applied to the impact absorption pipe 1 is converted into an energy which transforms the impact absorption pipe movement component 7 and is absorbed.

However, in the case where the controller 300 judges that a strong impact is predicted with an object which is a vehicle etc, the controller 300 instructs the impact absorption pipe wire lock mechanism 90 to release the impact absorption pipe wire 80 and also instructs the support part wire lock mechanism 9 to release the support part wire 8. The support part 5 is provided with an energization power by the rebound force of the compressed support part movement component 6, slides upwards along the side wall part 24, comes into contact with the upper part 21 and stops. In this state, because the second section 54 of the support part 5 is facing the exterior openings of each of the movable resistance body accommodation holes 25, each of the movable resistance bodies 3 can only move between the recess part 12 and the second section 54 (See FIG. 3(B)) respectively. Therefore, one part of each of the movable resistance bodies 3 is significantly projected from the interior openings of each of the movable resistance body accommodation holes 25 respectively and each of the movable resistance bodies 3 are built on each of the movable resistance body accommodation holes 25 and the recess part 12 respectively.

In the above stated state, when an impact is applied to the impact absorption pipe 1, the impact absorption pipe 1 moves in the direction of the interior of the opening of the body 2 (in the lower direction towards FIG. 4(B)) as shown in FIG. 4(B). Together with the movement of the impact absorption pipe 1, each of the movable resistance bodies 3 are moved in an exterior direction (that is, support part 5 direction) of each of the movable resistance body first accommodation holes 25 respectively by the tapered part 13. However, because the exterior opening is closed off by the second section 54, each of the movable resistance bodies 3 can not move respectively. As stated above, the distance from the second section 54 to the interior openings of each of the movable resistance body accommodation holes 25 is respectively smaller than the diameter of each of the movable resistance bodies 3. Therefore, one part of each of the movable resistance bodies 3 remains significantly projected from the interior openings of each of the movable resistance body accommodation holes 25 respectively. Furthermore, when the impact absorption pipe 1 moves, a strong friction or stress is generated between one part of each of the projected movable resistance bodies 3 and the impact absorption side wall part 15 and the impact absorption side wall part 15 is plastically transformed (see FIG. 4(B)). At this time, the compression and transformation of the impact absorption pipe movement component 7 which is arranged within the impact absorption pipe 1, is as stated above. Therefore, the impact which is applied to the impact absorption pipe 1 is converted to an energy which compresses and transforms the impact absorption pipe movement component 7 and absorbed in addition to each of the movable resistance bodies 3 which plastically transform the impact absorption side wall part 15 respectively. Because the two components are transformed, the impact energy is completely absorbed. As explained above, the impact absorbing device related to embodiment one of the present invention is controlled by the latching and release of the support part wire 8 and the impact absorption pipe wire 80 and can be prepared according to a predicted impact force. In addition, the impact absorbing device related to embodiment one of the present invention is housed within the bumper reinforcement during a normal state and is projected when a collision with an object is predicted. Therefore, the impact absorbing device related to embodiment one of the present invention does not affect the length of a vehicle and can be installed within a small space.

Even in the case where a collision with a vehicle etc is predicted and the impact absorption pipe 1 is projected, in the case where a collision is avoided, the impact absorbing device relating to embodiment one of the present invention can be restored to a normal state by an easy operation. That is, if the support part 5 is pulled back by again retracting the support part wire 8 and the support part wire 8 is latched by the support part wire lock mechanism 9 while in contact with the bottom part 26, a normal state is restored. In addition, no impact is applied to the projected impact absorption pipe 1. Therefore, if the impact absorption pipe wire 80 is retracted and latched by the impact absorption pipe wire lock mechanism 90, the impact absorption pipe 1 can be housed within the installation opening of the body 2 and a normal state is restored. However, because the support part 5 does not move in the case where a collision with a pedestrian etc is predicted, it is possible to restore the device to a normal state by only retracting the impact absorption pipe 1. Therefore, in whichever case, the impact absorbing device related to embodiment one of the present invention can be easily restored to a normal state and can be used again.

The impact absorption abilities of the impact absorbing device related to embodiment one of the present invention can be adjusted by the number of movable resistance bodies 3 which are arranged in the impact absorbing device. In the present embodiment, seven movable resistance body accommodation holes 25 are arranged at even intervals on the periphery of the interior wall part 24 and seven movable resistance bodies 3 are arranged within these holes respectively. However, the number of movable resistance bodies 3 and movable resistance body accommodation holes 25 which can be arranged is not limited to seven and can be adjusted according to a presumed impact force.

As explained above, the impact absorbing device related to embodiment one of the present invention can easily switch means for absorbing an impact between the case of a weak impact and the case of a strong impact by a simple structure. In addition, this impact absorbing device is housed within a vehicle bumper etc during a normal state and projects the impact absorption pipe 1 when a collision with an object is predicted. Therefore, this impact absorbing device can be installed in a small space and does not affect the length of a vehicle. Furthermore, because this impact absorbing device has an extremely simple structure comprised of the impact absorption pipe 1 and an attachment component, the number of parts is small and cost effective. Particularly, a bumper reinforcement can be utilized as the body 2 and thus has an excellent cost performance. In addition, by adjusting the number of arranged movable resistance bodies 3, the impact absorption abilities of the impact absorbing device can be finely adjusted. Furthermore, the impact absorbing device can be easily restored to a normal state from a state in which it is prepared for an impact. Therefore, this impact absorbing device can be repeatedly used in the case where a collision is avoided.

The impact absorbing device related to embodiment one of the present invention with the above structure is installed in a front bumper etc of a vehicle etc. The impact absorbing device 100 is installed in the forward part of the engine room of a vehicle and the support part wire 8 and the impact absorption pipe wire 80 are serially connected to the motor unit 200 and 210 respectively. The upper part of the impact absorption pipe 1 of the impact absorbing device 100 is installed in the rear part of the front bumper and the body 2 is arranged in the impact absorbing device installation opening which is arranged in the bumper reinforcement. The motor unit 200 and 210 are arranged under the engagement part of the front bumper and engine room. One controller 300 which is electrically connected to the motor unit 200 and 210 is installed in the interior of the driver's seat front panel. In addition, the radar 401 of the sensor device 400 is installed within the left and right side of the front bumper respectively and the CCD camera 402 is installed in the center of the controller 300. The sensor device 400 is electrically connected to the front bumper. Furthermore, in the present embodiment, an example where one impact absorbing device related to embodiment one of the present invention was arranged in the center of the interior of the front bumper, was shown. However, it is not limited to this. Two impact absorbing devices related to embodiment one of the present invention may be installed, one on the left and one on the right of a front bumper, and a motor unit 200, 210, a support part wire lock mechanism 9 and an impact absorption pipe wire lock mechanism 90 which are electrically connected to the controller 300 may be arranged in each impact absorbing device. In addition, more than two impact absorbing devices may be arranged. In this way, by adjusting the number of impact absorbing devices arranged it is possible to more completely absorb an impact from a collision with a vehicle etc.

In addition, the impact absorbing device related to embodiment one of the present invention may be installed in both the front and rear end bumpers. A plurality of more than two impact absorbing devices may also be installed in each of the front and rear bumpers. In this case a sensor etc is also arranged in the rear bumper.

Furthermore, the impact absorbing device related to embodiment one of the present invention may be used as a side guard device on the side of a vehicle, for example, the device may be used in combination with a large scale side skirt. By using the impact absorbing device in this way, it is generally more effective at absorbing an impact from a collision with the fragile side part of a vehicle than an impact from a collision with a front or rear part of a vehicle and passenger safety can be secured.

According to the present invention, an impact absorbing device having a structure which can easily and completely absorb an impact, with adjustable impact absorption abilities according to a collision object is proposed.

Embodiment Two

The impact absorbing abilities of the impact absorbing device relating to embodiment two of the present invention can be adjusted in the same way as the impact absorbing device related to embodiment one of the present invention by installing a resistance component 60 arranged with one or more movable resistance bodies 3 within an impact absorption pipe 1.

Figure 5:
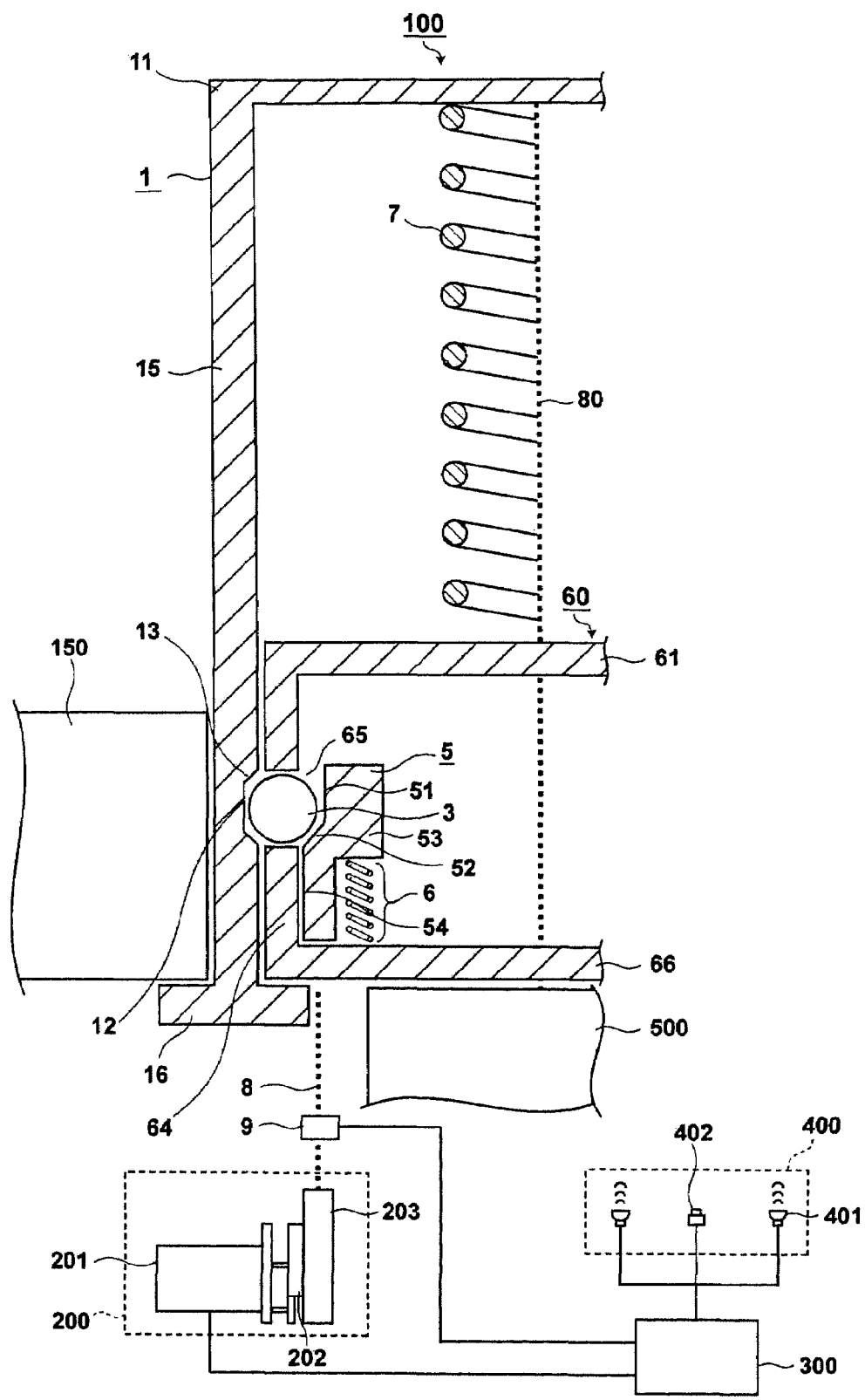
FIG. 5 is an outline structural diagram of an impact absorbing device related to embodiment two of the present invention.

The impact absorbing device related to embodiment two of the present invention will be explained. FIG. 5 is an outline structural diagram of an impact absorbing device related to embodiment two of the present invention. As shown in FIG. 5, this impact absorbing device is arranged with support part 5 which supports one or more movable resistance bodies 3 and impact absorption pipe 1. Each of the movable resistance bodies 3 plastically transform the impact absorption pipe 1 respectively and are arranged on the interior of the impact absorption pipe 1 respectively. In this way, the installation space of the impact absorption pipe 1 is sufficient to install the impact absorbing device and thus it is possible to minimize installation space. Furthermore, housing the impact absorption pipe 1 within the bumper of a vehicle during a normal state and projecting the impact absorption pipe 1 at the time of a collision with an object and adjusting the impact absorption abilities of the impact absorbing device are the same as in the impact absorbing device related to embodiment one of this invention. In addition, because many of the structural parts and their arrangements are common to the impact absorbing device related to embodiment one of the present invention the same symbols have been used in the drawings for the same parts and thus their explanation is omitted.

The impact absorbing device related to the present embodiment does not include an attachment component. An impact absorbing device installation opening is arranged in advance on a bumper reinforcement 150 of a vehicle and it is possible to insert the impact absorbing device related to the present embodiment from the interior of the bumper reinforcement 150.

The impact absorption pipe 1 is almost the same as the impact absorption pipe related to embodiment one of the present invention, however, the recess part 12 is arranged on the interior of the impact absorption pipe 1. In addition, the impact absorption pipe bottom part flange 16 projects both in an exterior and interior direction. However, it is not limited to this. The impact absorption pipe bottom part flange 16 may project in only one direction. The impact absorption part wall part 15 is formed from a less hard material than one or more movable resistance bodies 3 and at least the upper part of the recess part 12 has a tapered part 13. This is the same as the impact absorbing device related to embodiment one of the present invention.

Unlike the impact absorbing device related to embodiment one of the present invention, the impact absorbing device related to embodiment two of the present invention includes a resistance component 60 arranged within the impact absorption pipe 1. The resistance component 60 includes an upper part 61 and a bottom part 66 which have a closed cylindrical shape and at least one or more movable resistance body accommodation holes 65 arranged on an interior side wall 64. Furthermore, although the upper part 61 and the bottom part 66 have a closed shape, a through hole which allows the support part wire 8 and the impact absorption pipe wire 80 to pass through at a predetermined position is also arranged. The exterior diameter of the resistance component 60 is smaller than the interior diameter of the impact absorption pipe 1. And, the resistance component 60 can slide axially and coaxially within the impact absorption 1.

The support part 5 is arranged coaxially so that is can slide along the side wall part 64 within the resistance component 60. In the present embodiment, the support part 5 has a donut shape with an opening in the center, however it is not limited to this shape. For example the upper part 61 may have a closed cylindrical shape. In this case, the resistance component 60 has a through hole on the upper part 61 which allows the impact absorption pipe wire 80 to pass through. One end of the support part wire 8 is connected to the bottom part of the support 5 and the support part movement component 6 is arranged between the support part upper part flange 53 and the resistance component bottom part 66. This is the same as the impact absorbing device related to embodiment one of the present invention. In addition, a first section 51, a second section 54 and a first tapered part 52 are arranged on the exterior side wall of the support part 5. In the case where the support part 5 is arranged on the interior of the impact absorption pipe 1, the distance between the first section 51 and each of the openings (below called exterior opening respectively) which face the impact absorption pipe 1 of each of the movable resistance body accommodation holes 65 are set larger than the diameter of each of the movable resistance bodies 3 arranged within each of the movable resistance body accommodation holes 65 respectively. However, the distance between the second section 54 and the exterior openings of the same movable resistance body accommodation holes 65 are set smaller than the diameter of each of the movable resistance bodies 3 respectively. This setting method is the same as in embodiment one stated above and as a result, one part of each of the movable resistance bodies 3 is sometimes projected and not projected from each of the movable resistance body accommodation holes 65 respectively, the same as in embodiment one.

The impact absorption pipe movement component 7 is arranged within the impact absorption pipe 1. The impact absorption pipe movement component 7 is arranged between the interior of the upper part 11 of the impact absorption pipe 1 and the exterior of the upper part 61 of the resistance component 60. In the present embodiment a coil spring is used however the impact absorption pipe movement component 7 of the present invention is not limited to a coil spring. The exterior of the bottom part 66 of the resistance component 60 is pushed by a vehicle side pushed component 500 which is arranged in advance on a vehicle and the impact absorbing device related to the present invention is arranged on the vehicle. And, by retracting the impact absorption pipe wire 80 which is connected to the center of the interior of the upper part 11 of the impact absorption pipe 1, the impact absorption pipe 1 is housed within the bumper of a vehicle while the impact absorption pipe movement component 7 is compressed. By releasing the impact absorption pipe wire 80 the impact absorption pipe 1 is provided with an energization power by the rebound force of the impact absorption pipe movement component 7 and it is possible to project the impact absorption pipe 1 from the bumper. Therefore, during a normal state the impact absorption pipe 1 is housed within a bumper and when a collision with an object is predicted it is possible to project the impact absorption pipe 1. Furthermore, the bottom part flange 16 of the impact absorption pipe 1 of the impact absorbing device related to the present embodiment is projected in an exterior and interior direction. This is for stopping the projection of the impact absorption pipe 1 in the case where the impact absorption pipe 1 is projected from a housing state. One end of the bottom part flange 16 comes into contact with the bumper reinforcement 150 and the other end comes into contact with the bottom part 66 of the resistance component 60 and the projection of the impact absorption pipe 1 is stopped. Therefore, in the impact absorbing device related to the present embodiment, for example, the resistance component 60 is latched to the vehicle side pushed component 500 then after arranging the impact absorption pipe movement component 7 the impact absorption pipe 1 is clipped over and lastly the bottom part flange 16 is arranged by welding etc. However, it is not limited to this. The impact absorption pipe 1 with no upper part 11 may be arranged on the bumper reinforcement and the upper part 11 may be formed after inserting the resistance component 60 and the impact absorption pipe movement component 7.

The operation of each part of the impact absorbing device related to the present invention at the time of absorbing an impact is the same as the impact absorbing device related to embodiment one of the present invention stated above. Therefore, while a detailed explanation is omitted here, the impact absorption pipe 1 is housed within a bumper reinforcement 150 during a normal state. When a collision with an object is predicted based on data from the sensor device 400 the impact absorption pipe wire 80 is released and the impact absorption pipe 1 is projected. At this time, when a weak impact force from a collision with an object is predicted the support part wire 8 is not released and a locked state is maintained. On the other hand, when a strong impact force from a collision with an object is predicted, in addition to releasing the impact absorption pipe wire 80, the controller 300 instructs the support part wire 8 to be released. When the support part wire 8 remains latched the first section 51 of the support part 5 faces each of the movable resistance body accommodation holes 65 of the resistance component side wall part 64. At this time, even if the projected impact absorption pipe 1 moves to the interior of the bumper reinforcement by an impact, no friction or stress is generated between each of the movable resistance bodies 3 and the impact absorption side wall part 15 respectively and the impact force of the object is absorbed as compressed transformation energy of the impact absorption pipe movement component 7. On the other hand, when the support part wire 8 is released, the second section 54 of the support part 5 faces each of the movable resistance body accommodation holes 65 and one part of each of the movable resistance bodies 3 is significantly projected from the exterior openings of each of the movable resistance body accommodation holes 65 respectively. An extremely strong friction or stress is generated between the impact absorption side wall part 15 of the impact absorption pipe 1 which receives an impact and moves in an interior direction of the bumper reinforcement, and each of the projected movable resistance bodies 3 respectively and the impact absorption side wall part 15 which has a low level of hardness is plastically transformed. Therefore, the impact force of an object is converted into an energy which plastically transforms the impact absorption side wall part 15 and an energy which compresses and transforms the impact absorption pipe movement component 7 and is absorbed. In this way, the impact absorption abilities of the impact absorbing device related to the present embodiment can also be adjusted. And, the impact absorption abilities can be adjusted by the number of arranged movable resistance bodies, the same as the impact absorbing device related to embodiment one.

In the case where a collision can be avoided, the impact absorbing device related to the present embodiment can be easily restored to a normal state by again retracting the support part wire 8 and the impact absorption pipe wire 80. Because this is the same as the impact absorbing device related to embodiment one it will not be explained here.

In addition, because the impact absorbing device related to the present embodiment and its effects are the same as the impact absorbing device related to embodiment one a detailed explanation is omitted. The impact absorption abilities of the impact absorbing device related to the present embodiment can be adjusted and the impact absorbing device can be housed within a bumper during a normal state. In addition, the impact absorbing device related to the present embodiment can be reused by a simple operation and because the number of parts is small the impact absorbing device related to the present embodiment is cost effective.

EXAMPLE ONE

A different example of the impact absorbing device related to embodiment one and embodiment two stated above will be explained. In the following examples, because many of the structural parts and their arrangements are common to the impact absorbing device related to embodiment one of the present invention the same symbols have been used in the drawings for the same parts and thus their explanation is omitted. In embodiment one and embodiment two of the present invention stated above, a support part is in a state which can absorb a strong impact by releasing a support part wire. However, in the present example, a strong impact can be absorbed by retracting the support part wire.

The impact absorbing device related to example one of the present invention will be explained centered on the points which differ from that of the impact absorbing device related to embodiment one stated above. This will be explained based on FIG. 6(B). FIG. 6(B) is an enlarged diagram of a part shown by A in FIG. 1. The exterior side of the bottom part of the support part 5 of the impact absorbing device related to example one of the present invention has a shape which slants to the interior from top to bottom and this part plays the same role as the support part upper part flange 53. Therefore, below, this part is called a support part bottom part flange 57 (below called bottom part flange). In addition, the positions of the first section 51 and the second section 54 of the support part 5 are different to embodiment one and embodiment two stated above. The second section 54 is positioned above the first section 51. Therefore, as shown in FIG. 6(B), the bottom part flange 57 is positioned behind the first section 51 of the support part 5. The support part movement component 6 is arranged between the bottom part flange 57 and the bottom part 26 and one end of the support part wire 8 is connected to the bottom part of the support part 5. This is the same as in embodiment one and embodiment two stated above.

In this structure, when the support part 5 moves in an upper direction of the attachment component by an energization power of the support part movement component 6 and comes into contact with the upper part 21, the first section 51 faces each of the movable resistance body accommodation holes 25 of the interior wall part 24. On the other hand, when the support part 5 moves in a lower direction of the attachment component by retracting the support part wire 8 and comes into contact with the bottom part 26, the second section 54 faces each of the movable resistance body accommodation holes 25.

The structure and arrangement of other parts are the same as embodiment one and embodiment two stated above. Therefore, when the first section 51 of the support part 5 faces each of the movable resistance body accommodation holes 25, even if the impact absorption pipe 1 moves in an interior direction of the bumper reinforcement, friction or stress is not generated between the impact absorption pipe 1 and each of the movable resistance bodies 3 respectively. When the second section 54 of the support part 5 faces each of the movable resistance body accommodation holes 25, the movement of each of the movable resistance bodies 3 to the support part 5 side is restricted respectively and each of the movable resistance bodies 3 is significantly projected from the openings of the impact absorption pipe 1 side of each of the movable resistance body accommodation holes 25 respectively. Therefore, when the impact absorption pipe 1 moves in an interior direction of the bumper reinforcement, an extremely strong friction or stress is generated between each of the movable resistance bodies 3 and the impact absorption side wall 15 respectively and the impact absorption side wall 15 is plastically transformed.

Due the above stated operation, the support part wire 8 is in a released state when the impact absorbing device is in a normal state. In addition, when the controller 300 predicts a weak impact from a collision with an object, this released state is maintained and when a strong impact from a collision with an object is predicated, the support part wire 8 is retracted by the motor unit 200 and latched by the support part wire lock mechanism 9. When a collision with an object is predicted, the controller 300 instructs the impact absorption pipe wire lock mechanism 90 to release the impact absorption pipe wire 80 in order to project the impact absorption pipe 1. The support part wire 8 is not retracted. On the other hand, in order to prepare for a strong impact, the impact absorption pipe wire 80 is released and the support part wire 8 is retracted. Therefore, the retraction and release operations of the wires 8 and 80 become the opposite and it is possible to prevent miss-operation.

The impact absorbing device related to example one of the present invention was explained above based on the impact absorbing device shown in embodiment one, however the structure of the support part 5 can be applied to the impact absorbing device related to embodiment one and/or embodiment two stated above. The effects of the impact absorbing device which includes a support part 5 with this structure are the same as the impact absorbing device shown in embodiment one and embodiment two stated above. The impact absorption abilities of the impact absorbing device related to this example can be adjusted and the impact absorbing device can be housed within a bumper during a normal state. In addition, the impact absorbing device related to this example can be reused by a simple operation and because there are few parts the impact absorbing device related to this example is cost effective.

EXAMPLE TWO

The impact absorption abilities of the impact absorbing device related to example two of the present invention can be adjusted between three levels. This will be explained based on FIG. 7. The same parts which are included in embodiment one, embodiment two and example one stated above have the same symbols and their explanation is omitted here.

Figure 7:
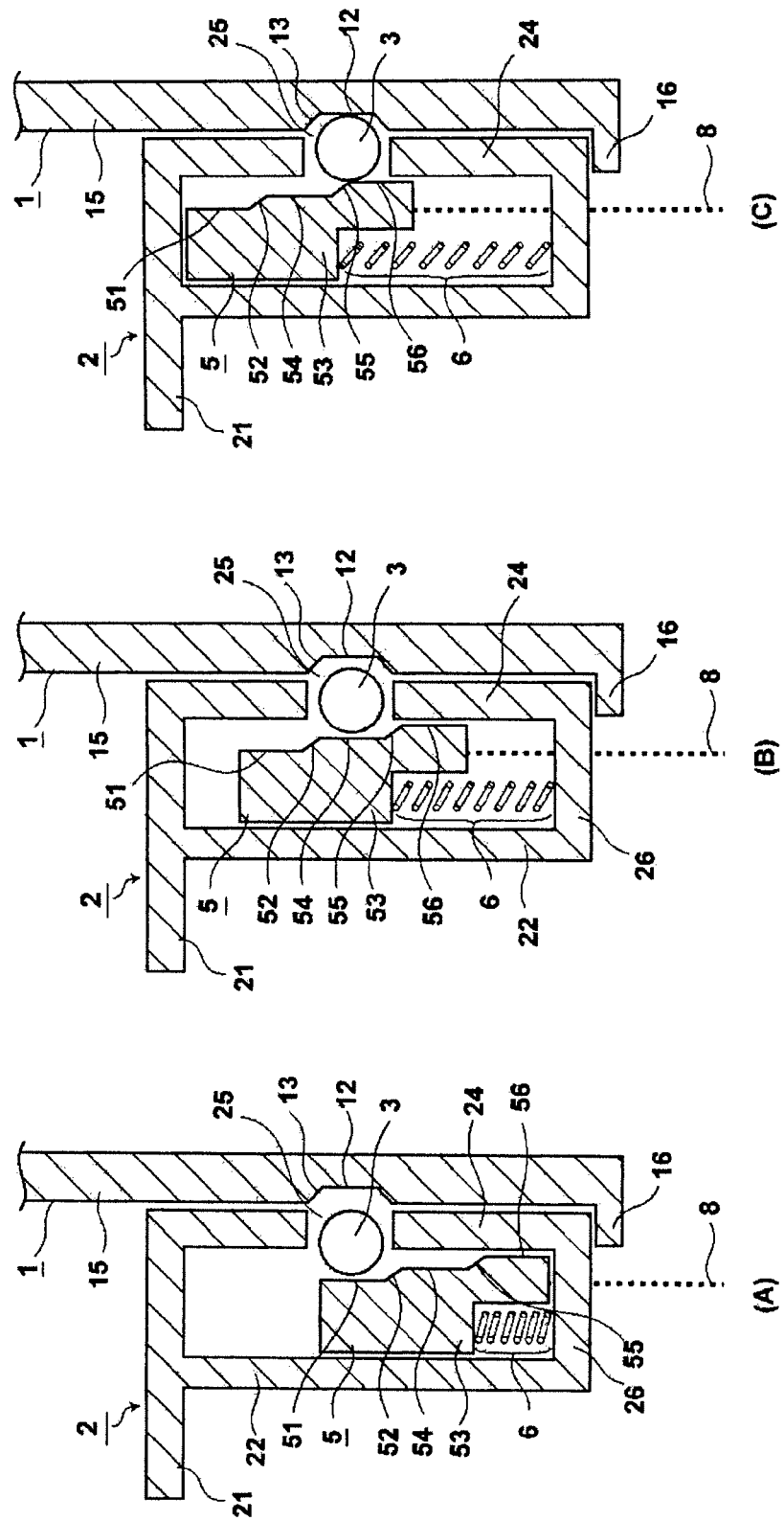
FIG. 7 is a structural diagram applied to part A shown in FIG. 1 of a support body of an impact absorbing device related to example two of the present invention.

The impact absorbing device related to example two of the present invention will be explained centered on the points which differ from that of the impact absorbing device related to embodiment one stated above. FIG. 7 is an enlarged diagram of the impact absorption part which is shown by A in FIG. 1 of the impact absorbing device related to example two of the present invention. FIG. 7(A) shows the case during a normal state and when a weak impact is predicted, FIG. 7(B) shows the case when a moderate impact is predicted and FIG. (C) shows the case when a strong impact is predicted. As shown in FIG. 7, in the impact absorbing device related to the present example, the shape of the support part 5 is different and the support part 5 has a first section 51, a second section 54 and a third section 56. That is, the interior side wall of the support part 5 has three parallel surfaces. And, similar to the support part first tapered part 53 which connects the first section 51 and the second section 54, the support part 5 includes a support part second tapered part 55 which connects the second section 54 and the third section 56 which has a tapered shape from a bottom direction to an upper direction. The distances between the first section 51, second section 54 and third section 56 and the interior wall part 24 become smaller in this order respectively. And, the first section 51 is positioned above the second section 54 and the second section 54 is positioned above the third section 56.

In the case where the support part 5 is arranged on the exterior of the interior wall part 24 of the body 2, the distance between the first section 51 and each of the openings (below called interior opening respectively) which face the impact absorption pipe 1 side of each of the movable resistance body accommodation holes 25 is set larger than the diameter of each of the movable resistance bodies 3 respectively which are arranged within each of the movable resistance body accommodation holes 25 respectively. Therefore, when the first section 51 is positioned so that it faces the openings (below called exterior opening respectively) of the support part 5 side of each of the movable resistance body accommodation holes 25, while one end of each of the movable resistance bodies 3 is in contact with the first section 51 respectively, the other end of each of the movable resistance bodies 3 is not projected from the interior openings of each of the movable resistance body accommodation holes 25 respectively. The distance between the second section and the interior openings of each of the movable resistance body accommodation holes 25 are set so that these are slightly smaller than the diameter of each of the movable resistance bodies 3 respectively. Therefore, when the second section 54 is positioned so that it faces the openings of the support part 5 side of each of the movable resistance body accommodation holes 25, while one end of each of the movable resistance bodies 3 is in contact with the second section 54 respectively, the other end of each of the movable resistance bodies 3 is slightly projected from the interior openings of each of the movable resistance body accommodation holes 25 respectively. The impact absorption mode of this state is called a first operation mode. The distance between the third section 56 and the interior openings of each of the movable resistance body accommodation holes 25 is set smaller than the diameter of each of the movable resistance bodies 3 respectively. Therefore, when the third section 56 is positioned so that it faces the openings of the support part 5 side of each of the movable resistance body accommodation holes 25, while one end of each of the movable resistance bodies 3 is in contact with the third section 56 respectively, the other end of each of the movable resistance bodies 3 is significantly projected from the interior openings of each of the movable resistance body accommodation holes 25 respectively. The impact absorption mode of this state is called a second operation mode. Because the other parts and their arrangement such as the support part 5, the attachment component body 2 and the impact absorption pipe 1 are the same as in example one and example two, an explanation is omitted.

When the controller 300 predicts a weak impact force from a collision with an object, the impact absorption pipe wire 80 is released while the support part wire 8 remains latched (see FIG. 7(A)). The impact absorption pipe 1 is projected from the housed bumper reinforcement by the release of the impact absorption pipe wire 80. In this state, when the impact absorption pipe 1 is applied with an impact, each of the movable resistance bodies 3 which are moved to the first section 51 side of each of the movable resistance body accommodation holes 25 by the impact absorption tapered part 13 respectively are not projected from the interior openings of each of the movable resistance body accommodation holes 25 respectively. Therefore, a friction etc is not generated between each of the movable resistance bodies 3 and the impact absorption side wall part 15 respectively and the impact absorption side wall part 15 is not plastically transformed. The impact force of a collision is converted to an energy which compresses and transforms the impact absorption pipe movement component 7 and is absorbed.

In the case where the controller 300 predicts a moderate impact force from a collision with an object, the impact absorption pipe wire 80 is released while the support part wire 8 is once released and when the support part wire 8 is withdrawn a certain distance from the support part wire lock mechanism 9, the support part wire 8 is again latched by the support part wire lock mechanism 9. By this series of operations, the first operation mode is activated and the impact absorption pipe 1 is projected from the bumper reinforcement. At this time, the second section 54 faces the openings of the support part 5 sides of each of the movable resistance body accommodation holes 25 (see FIG. 7(B)). In this state, when an impact is applied to the impact absorption pipe 1, one end of each of the movable resistance bodies 3 which are moved to the support part 5 side of the movable body accommodation holes 25 by the tapered part 13 respectively, come into contact with second section 54 and its movement is stopped respectively. At this time, the other end of each of the movable resistance bodies 3 is slightly projected from the interior openings of each of the movable resistance body accommodation holes 25 respectively. When the impact absorption pipe 1 is moved within the bumper reinforcement by an impact force, a friction or stress is generated between each of the movable resistance bodies 3 and the impact absorption side wall part 15 and the impact absorption side wall part 15 is plastically transformed. However, because each of the movable resistance bodies 3 is only slightly projected respectively, the friction or stress that is generated is not so strong and only a small amount of the impact absorption pipe 1 is plastically transformed. The impact force of a collision is converted into an energy which compresses and transforms the impact absorption pipe movement component 7 and also into an energy which plastically transforms a small amount of the impact absorption pipe 1 and is then absorbed.

When the controller 300 predicts a strong impact force from a collision with an object, the impact absorption pipe wire 80 and the support part wire 8 are both released. A second operation mode is activated by this operation and the impact absorption pipe 1 is projected from the bumper reinforcement. At this time, the third section 56 faces the openings of the support part 5 sides of each of the movable resistance body accommodation holes 25 (see FIG. 7(C)). In this state, when an impact is applied to the impact absorption pipe 1, one end of each of the movable resistance bodies 3 which are respectively moved to the support part 5 sides of each of the movable resistance holes 25 by the tapered part 13, come into contact with third section 56 and its movement is stopped respectively. At this time, the other end of each of the movable resistance bodies 3 is significantly projected from the interior openings of each of the movable resistance body accommodation holes 25 respectively. When the impact absorption pipe 1 is moved within the bumper reinforcement by an impact force, a friction or stress is generated between each of the movable resistance bodies 3 and the impact absorption side wall part 15 and the impact absorption side wall part 15 is plastically transformed. At this time, because each of the movable resistance bodies 3 is significantly projected respectively, the friction or stress that is generated is very strong and a large amount of the impact absorption pipe 1 is plastically transformed. The impact force of a collision is converted into an energy which compresses and transforms the impact absorption pipe movement component 7 and also into an energy which plastically transforms a large amount of the impact absorption pipe 1 and is then absorbed. As explained above, the impact absorbing device related to example two of the present invention is controlled by the latching and release of the support part wire 8 and the impact absorption pipe wire 80. And, the impact absorption abilities of the impact absorbing device related to example two of the present invention can be adjusted between three levels according to a predicted impact force. In addition, the impact absorbing device related to example two of the present invention is housed within a bumper reinforcement during a normal state and because the impact absorption pipe 1 is projected when a collision with an object is predicted, the impact absorbing device does not affect the length of a vehicle and installation space is reduced.

The support part 5 with this type of structure can also be applied to the impact absorbing device related to embodiment two of the present invention. In addition, the positions of the first section 51, second section 54 and third section 56 can be the same as in the impact absorbing device shown in example one of the present invention stated above. The second section 54 is arranged above the first section 51 and the third section 56 may be arranged above the second section 54. In this case, during a normal state the support part wire 8 is released and the first section 51 is positioned so that it faces the openings of the support part 5 sides of each of the movable resistance body accommodation holes 25. And, the support part wire 8 is retracted according to the presumed impact force and the second section 54 or the third section 56 is positioned so that it faces the openings of the support part 5 sides of each of the movable resistance body accommodation holes 25. Furthermore, as stated in embodiment one, the support part movement component 6 may be arranged on the interior wall part 24 side of the support part 5 or the impact absorption device installation opening of the bumper reinforcement side of the support part 5.

Because the effects of the impact absorbing device which includes a support part 5 with this structure are the same as the impact absorbing device shown in embodiment one and embodiment two stated above a detailed explanation is omitted. The impact absorption abilities of the impact absorbing device related to the present example can be adjusted and the device can be housed in a bumper during a normal state. In addition, the impact absorbing device related to the present example can be reused by a simple operation and because there are few parts the impact absorbing device related to the present example is cost effective.

EXAMPLE THREE

The impact absorbing device related to example three of the present invention will be explained. The impact absorbing device of embodiment one, embodiment two and example one and example two can absorb an impact force from a collision with an object by plastically transforming the impact absorption pipe 1. The impact absorbing device related to the present example uses a pipe having elastic characteristics for the impact absorption pipe 1 and absorbs an energy from a collision by elastically transforming the impact absorption side wall part 15. Therefore, even in the case where a collision occurs, it is possible to easily restore the impact absorbing device to a normal state and is very efficient in terms of maintenance. Because the structural parts of the impact absorbing device related to the present example are the same as those of the impact absorbing device related to embodiments one and two of the present invention stated above, an explanation and illustration in the diagrams of the parts structure and their arrangement is omitted. However, the example which is applied to the impact absorbing device related to embodiment one of the present invention shown in FIG. 1 will be explained based on FIG. 1.

In the impact absorbing device related to the present example the impact absorption side wall part 15 is formed from a material having elastic characteristics unlike the material of the impact absorption side wall part 15 related to embodiment one. In the present example, the impact absorption pipe 1 is formed from heat treated carbon steel pipe for machine structure SKTM 13 having elastic characteristics, however it is not limited to this. A material having elastic characteristics and heat treated such as other carbon steel pipes for machine structure (STKM material) or spring-steel steel materials (SUP10 material) for example can be used. In addition a resin for example having elastic characteristics can also be used.

Because the operation of each part of the impact absorbing device related to the present example during a collision with an object is the same as in embodiment one stated above, an explanation of the operation of each part is omitted here. In the case where a strong impact is applied, a strong friction or stress is generated between each of the movable resistance bodies 3 and the impact absorption side wall part 15 respectively. At this time, the impact absorption pipe movement component 7 is compressed and plastically transformed and the impact absorption side wall part 15 is elastically transformed and the impact is absorbed. The impact force is completely absorbed by elastically transforming the impact absorption side wall part 15. On the other hand, when a weak impact is applied, because a friction or stress is not generated between each of the movable resistance bodies 3 and the impact absorption side wall part 15 respectively, only the impact absorption pipe movement component 7 is compressed and transformed while the impact absorption side wall part 15 is not transformed. The method for controlling the impact absorption method according to a predicted impact force by the sensor device 400 and the controller 300 is the same as in embodiment one stated above. Furthermore, the impact absorption abilities can be adjusted by the number of movable resistance bodies 3 which are arranged.

In the impact absorbing device related to the present example, because the impact absorption pipe 1 is elastically transformed and the impact force is absorbed, the impact absorbing device can be easily restored to a normal state even after a collision. The impact absorption pipe 1 moves in an upper direction by the rebound force of the impact absorption pipe movement component 7 which is compressed by the collision. At this time, each of the movable resistance bodies 3 which elastically transformed the impact absorption pipe 1 move in the upper direction with the impact absorption pipe 1 respectively. The movement of each of the movable resistance bodies 3 is released by the recess part 12 and the impact absorption pipe 1 which expands in an interior direction is restored to a normal state. In this way, the impact absorbing device can be easily restored to a normal state. Therefore, maintenance costs can be kept low.

The impact absorption pipe 1 having these elastic characteristics can also be applied to embodiment two, example one and example two of the present invention stated above, can completely absorb an impact force and the effect whereby the device can be easily restored to a normal state is also the same. In addition, in the case where the device is applied to any of the embodiments and examples, the impact absorption abilities of the impact absorbing device related to the present example can be adjusted and the impact absorption pipe 1 can be housed within a bumper during a normal state. The impact absorbing device related to the present example can be reused by a simple operation and because there are few parts the impact absorbing device related to the present example is cost effective.

Furthermore, in the impact absorbing device related to all the embodiments and examples of the present invention stated above, seven movable resistance bodies 3 were arranged as shown in FIG. 8. However it is not limited to this number. Nine, eleven or a number which can be increased according to impact absorption abilities set in advance, can be arranged. In addition, an odd number or an even number of movable resistance bodies 3 can be arranged.

In addition, in the impact absorbing device related to all the embodiments and examples of the present invention stated above, the first section 51 and the second section 54 may be formed as a groove on the side wall part of the support part 5.

Furthermore, in the impact absorbing device related to all the embodiments and examples of the present invention stated above, the impact absorption pipe 1 is not limited to a cylindrical shape. The impact absorption pipe 1 may have a triangular column shape, a rectangular column shape or another shape such as an ellipsoid column shape. In addition, in this case, the shape of the opening of the installation component body 2 and the impact absorbing device installation opening may have a corresponding triangular, rectangular or ellipsoid shape.

Furthermore, in the impact absorbing device related to all the embodiments and examples of the present invention stated above, it is preferable that each of the movable resistance bodies 3 were steel spheres respectively. In addition, it was preferred that the shape of each of the movable resistance bodies 3 be a sphere respectively, however it is not limited to this. For example, a cylindrical shape, a rugby ball shape or a triangular shape may be used.

In addition, the sensor 400 is comprised of a radar 401 and a CCD camera 402. However, the sensor 400 is not limited to this. The radar 401 may be a millimeter wave radar, a laser radar or any other radar. Furthermore, the CCD camera is also not limited.

What is claimed is:

1. An impact absorbing device comprising:

an attachment component, the attachment component having an attachment component upper part, an attachment component bottom part and an attachment component interior side wall part, the attachment component upper part and the attachment component bottom part having an opening respectively, the attachment component interior side wall part having one or more holes, the attachment component side wall part connecting both openings;

an impact absorption pipe arranged so that the impact absorption pipe can slide axially and coaxially within the attachment component, the impact absorption pipe having an impact absorption pipe upper part, an impact absorption pipe bottom part and an impact absorption pipe side wall part, with the impact absorption pipe bottom part having a flange which projects towards the exterior, the impact absorption pipe side wall part absorbing external impacts and having a concave recessed part arranged on the exterior of the impact absorption pipe side wall part, and at least the upper side of the concave recessed part slanting from the upper side to the lower side of the impact absorption pipe;

one or more movable resistance bodies arranged so that the one or more movable resistance bodies can move freely within the one or more holes, the one or more movable resistance bodies being formed of a harder material than that of the impact absorption pipe side wall part;

an impact absorption pipe movement component support component arranged on the interior side of the impact absorption pipe;

an impact absorption pipe movement component arranged between the impact absorption pipe upper part and the impact absorption pipe movement component support component, with the impact absorption pipe movement component providing an energization power to the impact absorption pipe;

a support part movably arranged within the attachment component, the support part having a support part upper part and a support part side wall part, the support part upper part having a flange which projects towards the exterior, the support part side wall part having a first section and a second section formed in this order so that a distance between each of the sections and an interior side wall of the attachment component becomes smaller respectively, the first section being in a position which is above the second section, the first section being in a position which faces the one or more holes of the attachment component when the support part comes into contact with the attachment component bottom part; and a support part movement component which provides an energization power to the support part, the support part movement component being arranged between the support part upper part flange and the attachment component bottom part.

2. The impact absorbing device according to claim 1, wherein the attachment component is a bumper reinforcement arranged on a vehicle.

3. The impact absorbing device according to claim 2, wherein the support part includes a wire, with the wire being retracted and the support part movement component being compressed and the wire latched, such that by releasing the latched wire to a certain length and latching the wire again, a first operation mode is activated, and by releasing all of the wire, a second operation mode is activated.

4. The impact absorbing device according to claim 3, wherein the impact absorption pipe includes a wire such that by retracting and latching the wire the impact absorption pipe movement component is compressed, and by releasing the latching of the wire, the impact absorption pipe moves by an energization power of the impact absorption pipe movement component, with the impact absorption pipe being projected from an opening on the attachment component or a bumper reinforcement of a vehicle.

5. The impact absorbing device according to claim 4, wherein at least one of the support part movement component or the impact absorption pipe movement component is a spring.

6. The impact absorbing device according to claim 5 further comprising:
a motor unit;
a lock mechanism;
a sensor device which detects a distance to an object and an image data of an object; and
a controller electrically connected to the sensor device, the motor unit and the lock mechanism, the controller transmitting an operation instruction to the motor unit and the lock mechanism based on data from the sensor device, wherein the motor unit and the wire are connected in series and when the wire is retracted a predetermined distance by the motor unit, the wire is latched by the lock mechanism and by releasing the lock mechanism the wire becomes retractable.

7. The impact absorbing device according to claim 1, wherein the second section of the support part side wall part is in a position above the first section of the support part side wall part.

8. The impact absorbing device according to claim 1, wherein the support part includes a support part upper part and a support part side wall part, the support part side wall part having a first section and a second section formed in this order so that a distance between each of the sections and an interior side wall of the attachment component becomes smaller respectively, the first section being in a position which is above the second section, and the support part movement component being arranged between a lower side of the second section and the attachment component bottom part.

9. The impact absorbing device according to claim 1, wherein the support part side wall part includes first, second and third sections being formed in this order so that a distance between each of the sections and an interior side wall of the attachment component becomes smaller respectively, with the first section being in a position which is above the second section and the second section being in a position above the third section, such that, in a first operation mode, the second section faces the one or more holes of the attachment component, and in a second operation mode, the third section faces the one or more holes of the attachment component.

10. The impact absorbing device according to claim 1, wherein the impact absorption pipe includes a material having elastic characteristics.

11. A vehicle comprising:
an impact absorbing device according to claim 1.

12. An impact absorbing device comprising:
an impact absorption pipe arranged so that the impact absorption pipe can slide axially and coaxially within an installation opening, the impact absorption pipe having an impact absorption pipe upper part, an impact absorption side wall part and impact absorption pipe bottom part, the impact absorption pipe bottom part having an opening on the interior side of the impact absorption pipe bottom part, the impact absorption pipe bottom part also having at least one of a flange which projects in an exterior direction and a flange which projects in an interior direction, an impact absorption pipe side wall part which absorbs external impacts, the side impact absorption pipe side wall part having a concave recessed part arranged on the interior of the impact absorption pipe side wall part, and at least the upper side of the concave recessed part formed so that the concave recessed part slants from the upper side to the lower side of the impact absorption pipe;

a resistance component arranged so that the resistance component can slide axially and coaxially within the impact absorption pipe, the resistance component having a resistance component upper part, a resistance component the wall part and a resistance component bottom part, the resistance component side wall part having one or more holes;

one or more movable resistance bodies arranged so that the one or more movable resistance bodies can move freely within the one or more holes of the resistance pipe side wall part, the one or more movable resistance bodies being formed of a harder material than that of the resistance pipe side wall part;

an impact absorption pipe movement component which provides an energization power to the impact absorption pipe, the impact absorption pipe movement component being arranged between the impact absorption pipe upper part and the resistance component upper part;

a support part movably arranged within the resistance component, the support part having a support part upper part and a support part side wall part, the support part upper part having a flange which projects towards the interior, the support part side wall part having first and second sections formed in this order so that a distance between each of the sections and an interior side wall of the resistance component becomes smaller respectively, with the first section being in a position which is above the second section, and with the first section being in a position which faces the one or more holes of the resistance component when the support part comes into contact with the resistance component bottom part; and a support part movement component which provides an energization power to the support part, the support part movement component being arranged between the support part upper part flange and the resistance component bottom part.

13. The impact absorbing device according to claim 12, wherein the installation opening is arranged on a bumper reinforcement which is arranged on a vehicle.

14. The impact absorbing device according to claim 13, wherein the support part includes a wire, the wire being retracted and the support part movement component being compressed and the wire latched, such that by releasing the latched wire to a certain length and latching the wire again, a first operation mode is activated, and by releasing all of the wire, a second operation mode is activated.

15. The impact absorbing device according to claim 14, wherein the impact absorption pipe includes a wire such that by retracting and latching the wire the impact absorption pipe movement component is compressed, and by releasing the latching of the wire, the impact absorption pipe moves by an energization power of the impact absorption pipe movement component, with the impact absorption pipe being projected from the installation opening which is arranged on an attachment component or a bumper reinforcement of a vehicle.

16. The impact absorbing device according to claim 15, wherein at least one of the support part movement component or the impact absorption pipe movement component is a spring.

17. The impact absorbing device according to claim 16 further comprising:
 a motor unit;
 a lock mechanism;
 a sensor device which detects a distance to an object and an image data of an object; and
 a controller electrically connected to the sensor device, the motor unit and the lock mechanism, the controller transmitting an operation instruction to the motor unit and the lock mechanism based on data from the sensor device, wherein
 the motor unit and the wire are connected in series such that when the wire is retracted a predetermined distance by the motor unit, the wire is latched by the lock mechanism and by releasing the lock mechanism the wire becomes retractable.

18. The impact absorbing device according to claim 12, wherein the second section of the support part side wall part is in a position above the first section of the support part side wall part.

19. The impact absorbing device according to claim 12, wherein the support part includes a support part upper part and a support part side wall part, the support part side wall part having a first section and a second section formed in this order so that a distance between each of the sections and an interior side wall of the attachment component becomes smaller respectively, the first section being in a position which is above the second section, and the support part movement component being arranged between a lower side of the second section and the resistance component bottom part.

20. The impact absorbing device according to claim 12, wherein the support part side wall part includes first, second and third sections being formed in this order so that a distance between each of the sections and an interior side wall of the attachment component becomes smaller respectively, with the third section being in a position which is above the second section and the second section being in a position above the first section, such that in a first operation mode the second section faces the one or more holes of the resistance component, and in a second operation mode the third section faces the one or more holes of the resistance component.

21. The impact absorbing device according to claim 12, wherein the impact absorption pipe includes a material having elastic characteristics.

22. A vehicle comprising:
 An impact absorbing device according to claim 12.

* * * * *